P. A. FERBRACHE.
OVEN THERMOMETER.
No. 185,170.        Patented Dec. 12, 1876.
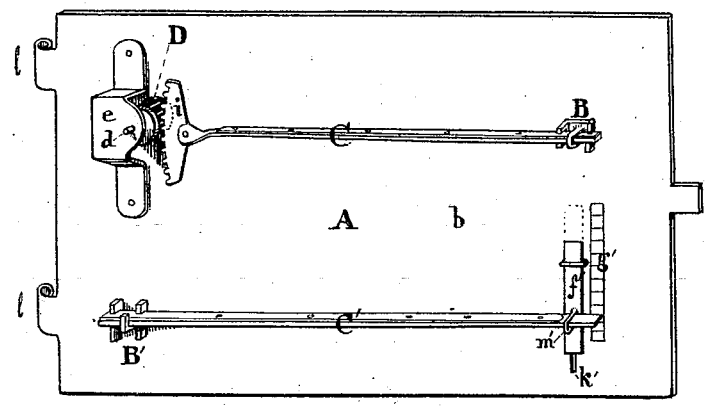
Fig. 1.
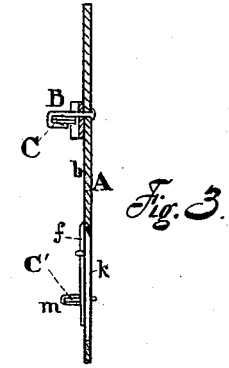
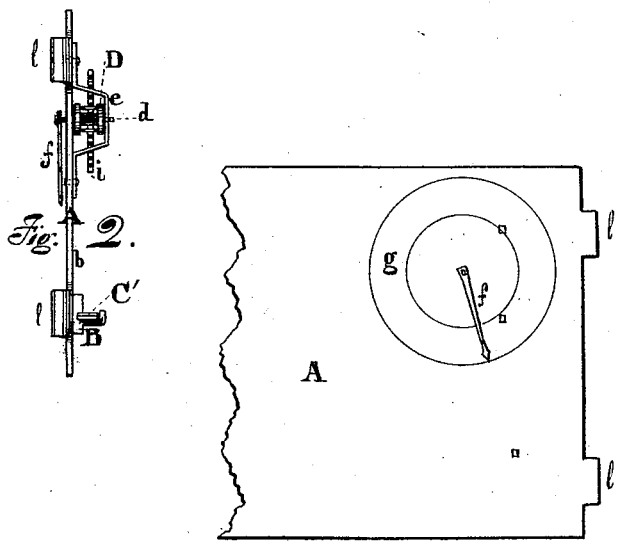
Fig. 4.
Witnesses.
Thos Vivian
W. H. Marks
Peter A. Ferbrache
by E. Thurlow his atty
in fact

UNITED STATES PATENT OFFICE.

PETER A. FERBRACHE, OF WADY PETRA, ILLINOIS.

IMPROVEMENT IN OVEN-THERMOMETERS.

Specification forming part of Letters Patent No. 185,170, dated December 12, 1876; application filed April 15, 1876.

*To all whom it may concern:*

Be it known that I, PETER A. FERBRACHE, of Wady Petra, in the county of Peoria, in the State of Illinois, have invented an Improvement in Oven-Thermometer, or thermometer for indicating the heat of ovens, particularly of stove-ovens; and do hereby declare that the following is a full, clear, and exact description thereof, reference being had to the annexed drawings, making a part of this specification, in which like letters of reference refer to like parts, and in which—

Figure 1 represents a perspective view of an oven-door with thermometer attached to its inner face; Fig. 2, an end view of Fig. 1; Fig. 3, an end view of Fig. 1, seen from the latch end; Fig. 4, a view of the exterior of the door, showing the dial.

My improvement in oven-thermometers consists in employing and adapting in place of a mercurial thermometer the well-known double bar, composed of metals of different expansive qualities, preferably iron or steel and brass, riveted or otherwise fastened together. I use this composite bar either straight, curved, or circular, or in any shape that will best conserve the objects sought, and applied in such a manner, directly or indirectly, to a movable index, either rotary or sliding, as will best indicate or register the heat of the oven on the outside of the same. I attach the thermometer to any part of the oven, the spindle of the index passing through the walls to an exterior dial or graduated scale. I attach the thermometer, preferably, to the door of the oven, as the instrument would be less likely to be unduly influenced by the heat, and, moreover, but one thickness of iron would necessarily have to be pierced for the passage of the spindle of the index.

In the drawings, which represent the form in which I construct my invention, A represents the oven-door, *b* being its inner side and the position for the thermometer; B, a firm stationary jaw or rest projecting from the inside face of said door, or set in the same by means of a stem passing through the same, and secured by riveting, nut, or other fastening on the outside, to afford a solid immovable hold for the base or end of the double bar C. This bar is composed of two parallel strips of metal, say steel and brass, or metals of unequal expansive properties, riveted together and set in the jaw B. The bar is attached to an index, *f*, which slides in a staple at one end, and is confined to a slot, *k*, by means of a pin having a lateral graduated scale for indicating heat. The thermometer is placed upon the door as being the position in the oven the least liable to be inordinately heated from the flues, and thus giving the mean heat.

What I claim as my invention is—

The combination, in an oven-thermometer, of door A, stationary jaw B, compound metallic bar C, index *f*, slot *k*, and scale *g*, substantially as and for the purposes described.

In testimony that I claim the foregoing thermometer for ovens I have hereunto set my hand this 3d day of April, 1876.

PETER A. FERBRACHE.

Witnesses:
JAMES M. MORSE,
H. W. WELLS.